(12) United States Patent
Suzuki et al.

(10) Patent No.: US 11,846,502 B2
(45) Date of Patent: Dec. 19, 2023

(54) TIRE DEVICE

(71) Applicant: DENSO CORPORATION, Kariya (JP)

(72) Inventors: Youichiro Suzuki, Nisshin (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/682,873

(22) Filed: Feb. 28, 2022

(65) Prior Publication Data

US 2022/0268577 A1 Aug. 25, 2022

Related U.S. Application Data

(63) Continuation of application No. PCT/JP2020/033100, filed on Sep. 1, 2020.

(30) Foreign Application Priority Data

Sep. 4, 2019 (JP) .................. 2019-161333

(51) Int. Cl.
*G01B 17/08* (2006.01)
*B60C 11/24* (2006.01)
(Continued)

(52) U.S. Cl.
CPC ............ *G01B 17/08* (2013.01); *B60C 11/246* (2013.01); *B60C 23/08* (2013.01); *B60W 40/064* (2013.01);
(Continued)

(58) Field of Classification Search
CPC ....... G01B 17/08; B60C 11/246; B60C 11/24; B60C 23/08; G01M 17/025; B60W 40/064; B60W 40/068
See application file for complete search history.

(56) References Cited

U.S. PATENT DOCUMENTS 6,385,553 B1 * 5/2002 Naito .................... B60C 23/062
73/146.2
2010/0199756 A1 * 8/2010 Hanatsuka .............. B60C 11/24
73/146

(Continued)

FOREIGN PATENT DOCUMENTS

JP 2004175276 A 6/2004
JP 2005170222 A 6/2005

(Continued)

OTHER PUBLICATIONS

U.S. Appl. No. 17/682,724, filed Feb. 28, 2022, Suzuki et al.

*Primary Examiner* — Helen C Kwok
(74) *Attorney, Agent, or Firm* — Harness, Dickey & Pierce, P.L.C.

(57) ABSTRACT

A tire device has a tire side device and a vehicle body side system, and determines a road surface condition and detects a tire wear state. The tire side device includes a vibration detection unit that outputs a detection signal according to a magnitude of a tire vibration, a control unit extracts a feature amount during one rotation of the tire, and a first data communication unit that transmits a road surface data including a feature amount. The vehicle body side system includes a second data communication unit that receives road surface data, a road surface determination part that determines a road surface condition based on the road surface data, an integral calculation part that calculates an integral value of the feature amount in a specific frequency band included in the road surface data, and a wear determination part that detects the tire wear state from the integral value.

15 Claims, 11 Drawing Sheets

(51) Int. Cl.
*G01M 17/02* (2006.01)
*B60W 40/068* (2012.01)
*B60C 23/08* (2006.01)
*B60W 40/064* (2012.01)
*B60C 19/00* (2006.01)

(52) U.S. Cl.
CPC ........ *B60W 40/068* (2013.01); *G01M 17/025* (2013.01); *B60C 2019/004* (2013.01)

(56) References Cited

U.S. PATENT DOCUMENTS

| | | | |
|---|---|---|---|
| 2016/0250899 A1* | 9/2016 | Takahashi | G01M 17/02 |
| | | | 73/8 |
| 2016/0368502 A1* | 12/2016 | Suzuki | B60W 40/06 |
| 2019/0225227 A1* | 7/2019 | Mori | G01C 7/02 |
| 2020/0049497 A1 | 2/2020 | Suzuki et al. | |
| 2020/0348212 A1 | 11/2020 | Mori | |
| 2021/0237517 A1* | 8/2021 | Suzuki | B60C 11/246 |
| 2021/0291597 A1* | 9/2021 | Suzuki | B60C 11/243 |

FOREIGN PATENT DOCUMENTS

| | | |
|---|---|---|
| JP | 2006131136 A | 5/2006 |
| JP | 2009018667 A | 1/2009 |
| JP | 2016217065 A | 12/2016 |
| JP | 2018009974 A | 1/2018 |
| JP | 2018184101 A | 11/2018 |
| WO | WO-2019142870 A1 | 7/2019 |

\* cited by examiner

TIRE DEVICE

CROSS REFERENCE TO RELATED APPLICATIONS

This application is a continuation application of International Patent Application No. PCT/JP2020/033100 filed on Sep. 1, 2020, which designated the U.S. and based on and claims the benefits of priority of Japanese Patent Application No. 2019-161333 filed on Sep. 4, 2019. The entire disclosure of all of the above applications is incorporated herein by reference.

TECHNICAL FIELD

The present disclosure relates to a tire device having a tire side device and a vehicle body side system and capable of determining a road surface condition and detecting a tire wear state.

BACKGROUND

Conventionally, a tire device has a tire side device having an acceleration acquisition unit attached on a back surface of a tire tread, and the acceleration acquisition unit acquires a tire vibration as an acceleration and transmits the acquisition result to a vehicle body side system to estimate a road surface condition.

SUMMARY

An object of the present disclosure is to provide a tire device capable of realizing further power saving and memory saving while enabling detection of a road surface condition and a tire wear state.

In a tire device according to one aspect of the present disclosure, a tire side device includes a vibration detection unit that outputs a detection signal according to a magnitude of a tire vibration, a control unit having a feature amount extraction part that extract a feature amount for each frequency band from the detection signal during one rotation of the tire, and a first data communication unit that transmits a road surface data including the feature amount extracted by the feature amount extraction part. A vehicle body side system includes a second data communication unit that receives road surface data transmitted from the tire side device, a road surface determination part that determines a road surface condition of the traveling road surface based on the road surface data, an integral calculation part that calculates an integral value of the feature amount in a specific frequency band using the feature amount for each frequency band included in the road surface data, and a wear determination part that detects the tire wear state from the integral value of the feature amount.

DETAILED DESCRIPTION

Figure 1:
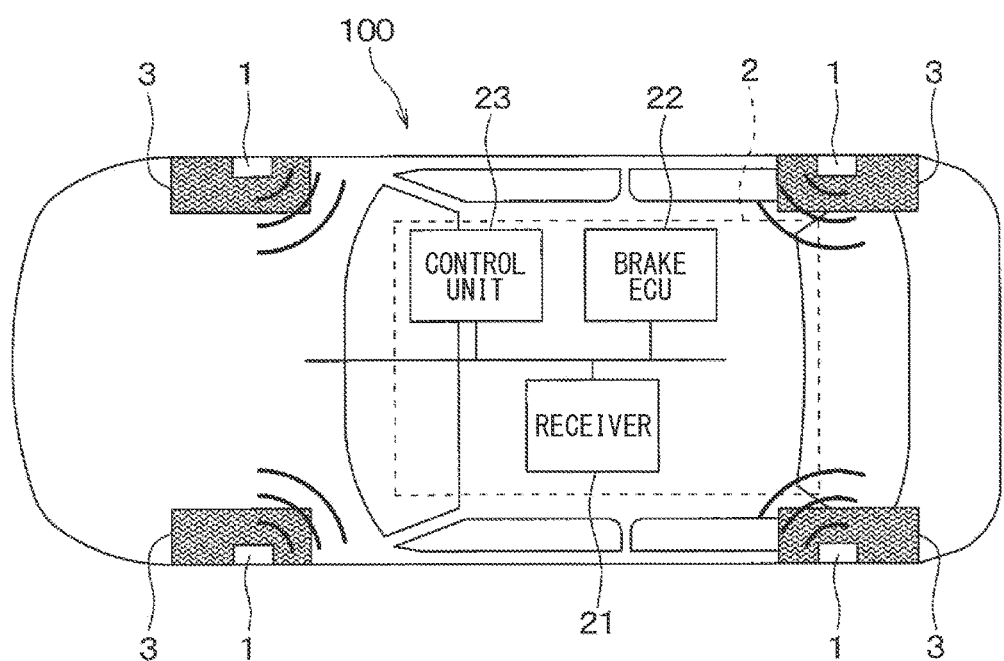
FIG. 1 is a view illustrating a block configuration of a tire device according to a first embodiment in a state where the tire device is mounted in a vehicle.

In an assumable example, a tire device has a tire side device having an acceleration acquisition unit attached on a back surface of a tire tread, and the acceleration acquisition unit acquires a tire vibration as an acceleration and transmits the acquisition result to a vehicle body side system to estimate a road surface condition. The tire device estimates the road surface condition by generating data representing a road surface condition based on a vibration waveform of the tire detected in the acceleration acquisition unit and transmitting the data of each road wheel to a vehicle body side receiver and the like. Then, in order to achieve power saving of the tire side device, the tire device determines a change in the road surface condition, and transmits an acquisition result of the vibration applied to the tire from the tire side device to the vehicle body side system at a timing when the road surface condition changes. That is, since the data transmission is performed only at the timing when the road surface condition for which the road surface condition is desired to be determined changes, communication is minimized and power saving is achieved.

In recent years, there is a need to detect a tire wear state as well. Therefore, it is conceivable to detect the tire wear state based on the vibration waveform of the tire acquired by the tire side device. However, in order to execute an algorithm for determining the road surface condition and an algorithm for detecting the tire wear state in a limited power supply and memory of the tire side device, it is necessary to minimize the sampling and storage of vibration waveforms and various arithmetic processes to save power and memory.

An object of the present disclosure is to provide a tire device capable of realizing further power saving and memory saving while enabling detection of a road surface condition and a tire wear state.

In a tire device according to one aspect of the present disclosure, a tire side device includes a vibration detection unit that outputs a detection signal according to a magnitude of a tire vibration, a control unit having a feature amount extraction part that extract a feature amount for each frequency band from the detection signal during one rotation of the tire, and a first data communication unit that transmits a road surface data including the feature amount extracted by the feature amount extraction part. A vehicle body side system includes a second data communication unit that receives road surface data transmitted from the tire side device, a road surface determination part that determines a road surface condition of the traveling road surface based on the road surface data, an integral calculation part that calculates an integral value of the feature amount in a specific frequency band using the feature amount for each frequency band included in the road surface data, and a wear determination part that detects the tire wear state from the integral value of the feature amount.

In this way, the road surface condition of the traveling road surface of the vehicle is discriminated and the tire wear state is detected. Specifically, the road surface data for determining the road surface condition is used, and the tire wear state is detected from the integral value of the feature amount of the specific frequency band in the road surface data. Therefore, it is not necessary to transmit data only for detecting the tire wear state, and it is not necessary to implement an algorithm for detecting the tire wear state on the tire side device. It is possible to save power and memory by minimizing sampling, storage, and various arithmetic processes. Therefore, the tire device can realize further power saving and memory saving while enabling the determination of the road surface condition and the detection of the tire wear state.

Hereinafter, embodiments of the present disclosure will be described with reference to the drawings. In the following embodiments, the same or equivalent parts are denoted by the same reference numerals.

First Embodiment

A tire device having a road surface condition determination function and a tire wear state detection function according to the present embodiment will be described. A tire device according to the present embodiment is configured to determine a road surface condition during traveling based on vibration applied to a ground contact surface of a tire provided in each of road wheels of a vehicle, and also performs warning of danger of the vehicle, vehicle movement control and the like based on the determined road surface condition. The tire device also detects the tire wear state based on the vibration applied to the ground contact surface of the tire.

Figure 2:
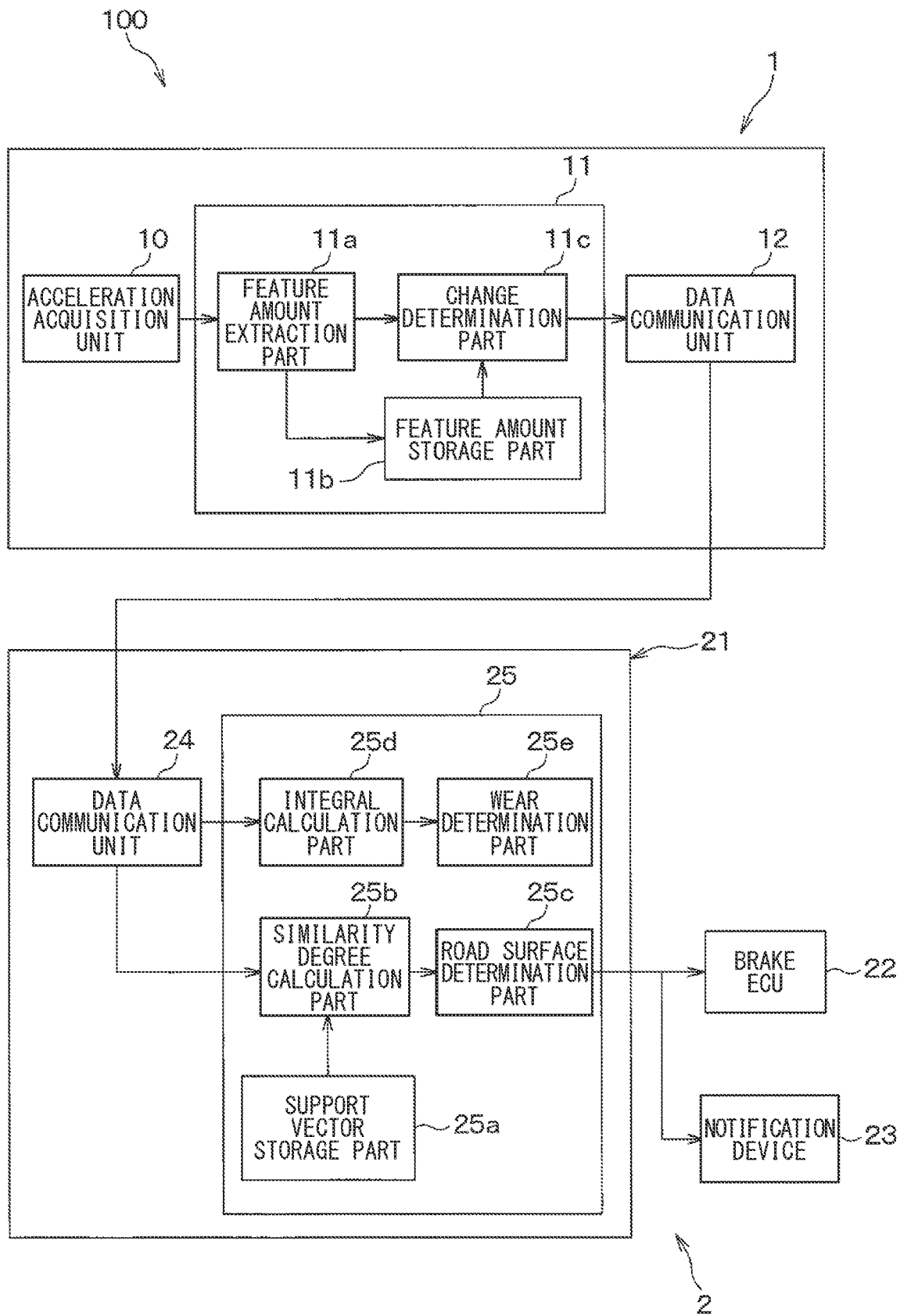
FIG. 2 is a block diagram showing respective details of a tire side device and a vehicle body side system.

As shown in FIGS. 1 and 2, a tire device 100 is configured to have a tire side device 1 provided on a wheel side and a vehicle body side system 2, which includes various parts provided on a vehicle body side. The vehicle body side system 2 includes a receiver 21, an electronic control unit 22 for brake control (hereinafter referred to as a brake ECU), a notification device 23 and the like.

The tire device 100 according to the present embodiment is configured to transmit data (hereinafter, referred to as a road surface data) corresponding to the road surface state of a road on which a tire 3 is traveling from the tire side device 1, and receive the road surface data by the receiver 21 to determine the road surface condition. Further, since the road surface data includes a component that changes according to the tire wear state, the receiver 21 also detects the tire wear state based on the road surface data. Further, the tire device 100 transmits a determination result of the road surface condition and a detection result of the tire wear state by the receiver 21 in the receiver 21 to a notification device 23, and the notification device 23 notifies the determination result of the road surface condition and the detection result of the tire wear state. It is thus made possible to notify a driver of the road surface condition, for example, that the road surface is dry, wet or frozen as well as the tire wear state. It is also made possible to warn the driver if the road surface is slippy or the tire wear is progressing. In addition, the tire device 100 is configured to perform a vehicle motion control for avoiding danger by transmitting the road surface condition to the brake ECU 22 and the like that perform vehicle motion control. For example, when the road surface is frozen, a braking force generated with respect to a brake operation amount is weakened as compared with the case of a dry road. So, the vehicle motion control should be adjusted when a road surface p is low. Specifically, the tire side device 1 and the receiver 21 are configured as follows.

Figure 3:
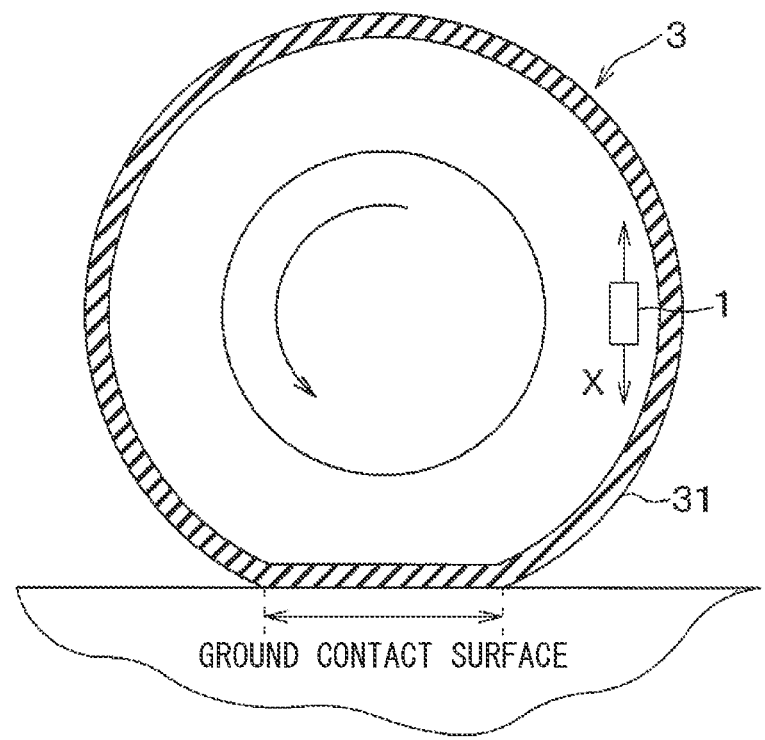
FIG. 3 is a schematic cross-sectional view of a tire to which a tire side device is attached.

As shown in FIG. 2, the tire side device 1 is configured to include an acceleration acquisition unit 10, a control unit 11, and a data communication unit 12, and as shown in FIG. 3, is provided on a back surface side of the tread 31 of the tire 3.

The acceleration acquisition unit 10 is configured as a vibration detection unit for detecting the vibration applied to the tire 3. For example, the acceleration acquisition unit 10 is configured by an acceleration sensor. In case that the acceleration acquisition unit 10 is configured by the acceleration sensor, the acceleration acquisition unit 10 outputs a detection signal of acceleration as the detection signal, which corresponds to the vibration in a direction tangential to a circular trajectory drawn up by the tire side device 1 at the time of rotation of the tire 3, that is, a tire tangential direction indicated by an arrow X in FIG. 3 More specifically, the acceleration acquisition unit 10 generates, as a detection signal, an output voltage and the like in which one of the two directions indicated by the arrow X is positive and the opposite direction is negative. For example, the acceleration acquisition unit 10 performs acceleration detection at a predetermined sampling cycle set at a cycle shorter than a period of one rotation of the tire 3, and outputs a detection result as the detection signal. Although the detection signal of the acceleration acquisition unit 10 may be represented as an output voltage or an output current, the detection signal is exemplified to be the output voltage in the present embodiment as an example.

The control unit 11 corresponds to a first control unit, is composed of a microcomputer equipped with a CPU, ROM, RAM, I/O, etc., and executes the above-mentioned processes according to a program stored in the ROM or the like. The control unit 11 is configured to include a feature amount extraction part 11a, a feature amount storage part 11b, and a change determination part 11c as functional parts for performing these processes.

The feature amount extraction part 11a uses the detection signal output by the acceleration acquisition unit 10 as a detection signal representing vibration data in a tire tangential direction, and processes this detection signal to extract the feature amount of the tire vibration. In the present embodiment, the control unit 11 performs a signal processing on the detection signal of the acceleration of the tire 3 (hereinafter referred to as a tire G), and extracts the feature amount of the tire G. Further, the feature amount extraction part 11a transmits the data including the extracted feature amount to the data communication unit 12 as road surface data via the change determination part 11c. Details of the feature amount will be described later.

The feature amount storage part 11b stores the feature amount (hereinafter, referred to as an immediately previous feature amount) extracted by the feature amount extraction part 11a before one rotation of the tire 3. Whether or not the tire 3 has made one rotation can be confirmed by a method described later, therefore, every time the tire 3 makes one rotation, the feature amount for one rotation is stored. Regarding the feature amount for one rotation of the tire 3, the data may be updated every time the tire 3 makes one rotation, or the data for a plurality of rotations may be stored and the oldest data may be deleted each time the tire 3 makes one rotation. However, from the viewpoint of saving the memory of the control unit 11 in the tire 3, it is preferable to reduce the amount of data to be stored. Therefore, it is preferable to update the data every time the tire 3 rotates.

The change determination part 11c is configured to determine whether or not there is a change about the road surface condition and transmit the road surface data to the data communication unit. Regarding the presence or absence of the change in the road surface condition, the change determination part 11c determines based on the feature amount (hereinafter referred to as a present feature amount) extracted by the feature amount extraction part 11a during the present rotation of the tire 3 and the immediately previous feature amount of the tire 3 stored in the feature amount storage part 11b. The details of the above mentioned determination will be described later. Then, when it is determined that the road surface condition has changed, the road surface data is transmitted to the data communication unit 12. Further, if it is determined that the road surface condition has not changed, the road surface data is not transmitted to the data communication unit 12.

The data communication unit 12 is a part constituting the first data communication unit. For example, when the road surface data is transmitted from the change determination part 11c, the road surface data including the present feature amount is transmitted at that timing. That is, the road surface data is transmitted only when the road surface condition changes.

On the other hand, as shown in FIG. 2, the receiver 21 is configured to include a data communication unit 24 and a control unit 25.

The data communication unit 24 is a part constituting a second data communication unit, and plays a role of receiving the road surface data including the present feature amount transmitted from the data communication unit 12 of the tire side device 1 and transmitting it to the control unit 25.

The control unit 25 corresponds to a second control unit, is configured by a microcomputer equipped with a CPU, ROM, RAM, I/O, etc., and performs various processes according to a program stored in the ROM or the like. The control unit 25 includes a support vector storage part 25a, a similarity degree calculation part 25b, a road surface determination part 25c, an integral calculation part 25d, and a wear determination part 25e as functional parts for performing various processes.

The support vector storage part 25a stores and saves the support vector for each type of road surface. The support vector is a feature amount serving as a model, and is acquired, for example, by learning using a support vector machine. The support vector is acquired by experimentally driving a vehicle equipped with the tire side device 1 on each type of road surface. During the experimental driving, the feature amount extracted by the feature amount extraction part 11a is learned for a predetermined number of tire rotations, and a predetermined number of typical feature amounts are extracted from the learned data. The support vector is the predetermined number of typical feature amounts. For example, the characteristic values are learned for one million rotations for each type of road surface, and a typical feature amount for one hundred rotations is extracted from the learned values as the support vector.

The similarity degree calculation part 25b calculates the similarity by comparing the present feature amount sent from the tire side device 1 at this time with the support vector for each type of road surface stored in the support vector storage part 25a. The degree of similarity indicates the degree of similarity with the support vector for each type of road surface, and means that the higher the degree of similarity, the more similar. The details regarding the degree of similarity will be described later.

The road surface determination part 25c determines the road surface condition using the degree of similarity calculated by the similarity degree calculation part 25b. For example, the present feature amount is compared with the support vector for each type of road surface at this time, and the road surface of the support vector having the highest degree of similarity is determined as a present traveling road surface.

The integral calculation part 25d calculates the integrated value of the feature amount including a component of a predetermined frequency band from the road surface data. As will be described later, the feature amount included in the road surface data is extracted by dividing the detection signal of the acceleration acquisition unit 10 into sections for each time window having a predetermined time width T and performing frequency analysis in each section. Therefore, the feature amount having the component of a predetermined frequency band is included in the extracted feature amount. By extracting the feature amounts having the components of the predetermined frequency band and adding them together, the integrated value of the feature amounts having the predetermined frequency band can be calculated.

The wear determination part 25e detects a tire wear amount based on the integrated value of the feature amount calculated by the integral calculation part 25d. The integrated value of the feature amount changes according to the tire wear amount, and has the characteristic that the integrated value becomes smaller as the tire wear amount increases. Therefore, the tire wear amount can be detected based on the integrated value of the feature amount.

Further, when the control unit 25 determines the road surface condition and detects the tire wear amount, the control unit 25 transmits information on the road surface condition and the tire wear amount to the notification device 23, and if necessary, the road surface condition and the tire wear amount can be notified to the driver from the notification device 23. As a result, the driver will try to drive according to the road surface condition, and if the amount of tire wear is large, the tires can be replaced. For example, the determined road surface condition may be displayed always by the notification device 23 or the road surface state may be displayed to warn the driver only when the vehicle need be driven more carefully than usual, for example, when the determined road surface condition corresponds to a wet road or a frozen road. Similarly, the tire wear amount may be always displayed through the notification device 23, or the tire wear amount may be displayed only when the tire wear amount is large, or a display prompting tire replacement may be performed.

The road surface state is transmitted from the receiver 21 to an ECU such as the brake ECU 22, which performs vehicle motion control, so that the vehicle motion control is performed based on the transmitted road surface condition.

The brake ECU 22 is configured as a brake control device that performs various brake controls. Specifically, the brake ECU 22 controls a braking force by increasing or decreasing a wheel cylinder pressure by driving an actuator, which controls a brake fluid pressure. In addition, the brake ECU 22 independently controls the braking force of each road wheel. When the road surface state is transmitted from the receiver 21, the brake ECU 22 controls the braking force as the vehicle motion control based on the transmitted road surface state. For example, when the transmitted road surface state indicates a frozen road, the brake ECU 22 weakens the braking force generated in response to the amount of brake operation by the driver, as compared to driving on a dry road. Thereby, wheel slip can be suppressed, and danger of the vehicle can be avoided.

The notification device 23 is configured with a meter display device, for example, and used to notify the driver of the road surface condition or the tire wear state. In case that the notification device 23 is configured with the meter display device, it is located at a position which the driver is capable of easy recognition during driving of the vehicle, for example, within an instrument panel in the vehicle. When the receiver 21 notifies the road surface condition and tire wear state, the meter display displays the road surface condition and tire wear state in a manner that the road surface condition and tire wear state can be recognized to the driver.

The notification device 23 may alternatively be configured as a buzzer or a voice guidance device. In such a case, the notification device 23 notifies the driver of the road surface condition and the tire wear state audibly by buzzer sound or voice guidance. Although the meter display device is exemplified as the notification device 23 providing visual notification, the notification device 23 may be configured as a display device that displays information such as a head up display.

The tire device 100 is configured as described above in the present embodiment. Each unit forming the vehicle body side system 2 is connected through an in-vehicle LAN (Local Area Network) like CAN (Controller Area Network) communication.

Therefore, each unit can communicate information with each other through the in-vehicle LAN.

Next, a description will be given of details of the feature amount extracted by the feature amount extraction part 11a described above and of the determination of a change in the road surface condition by the change determination part 11c.

First, the feature amount extracted by the feature amount extraction part 11a will be described. The feature amount referred to here is a quantity indicating the feature of the vibration applied to the tire 3 acquired by the acceleration acquisition unit 10, and is represented as, for example, a feature vector.

Figure 4:
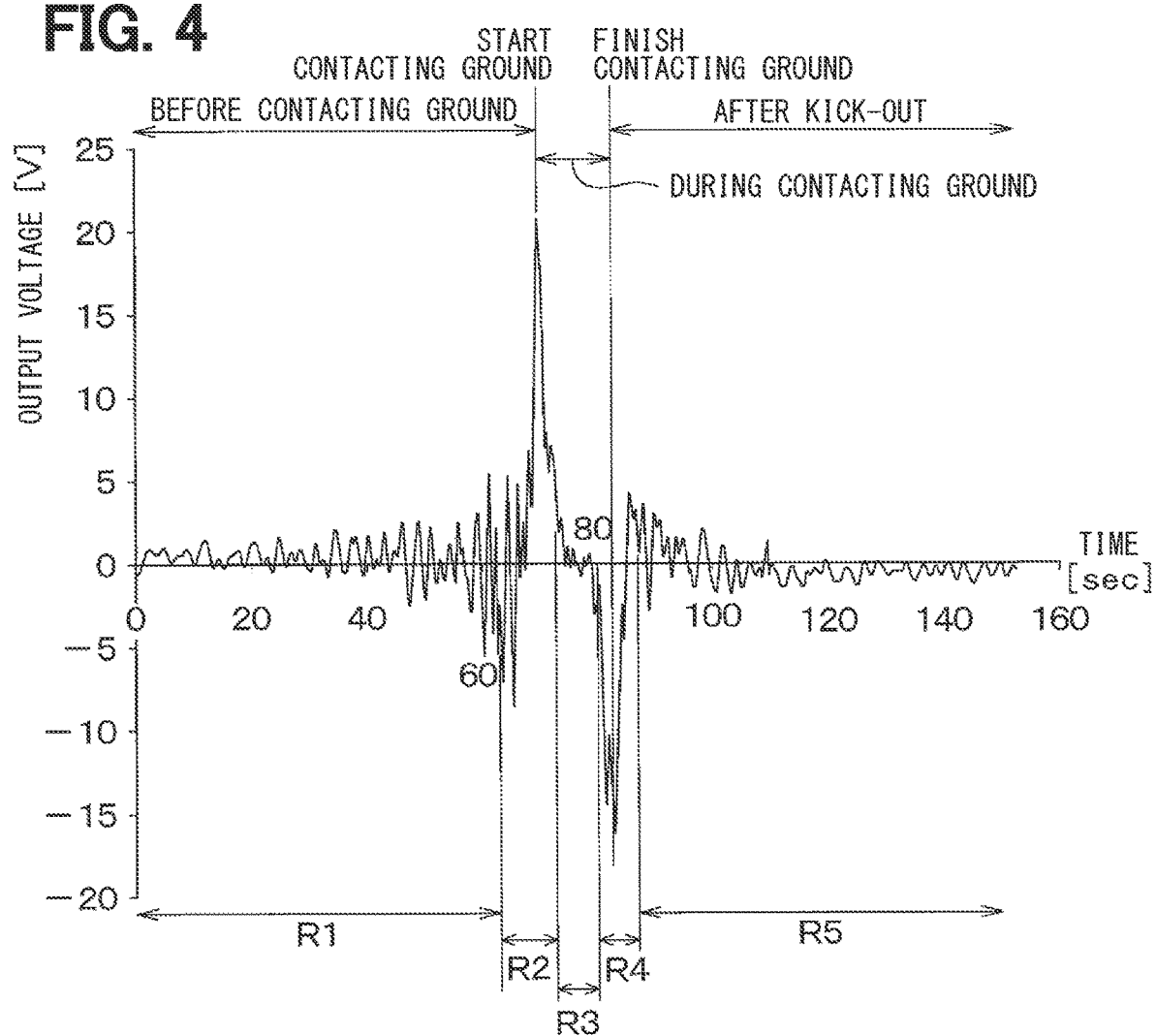
FIG. 4 is a chart illustrating an output voltage waveform of an acceleration acquisition unit during tire rotation

The output voltage waveform of the detection signal of the acceleration acquisition unit 10 when the tire is rotating is, for example, the waveform shown in FIG. 4. As shown in FIG. 4, the output voltage of the acceleration acquisition unit 10 has a maximum value at a contact start time when the portion of the tread 31 of the tire 3 corresponding to the position of the acceleration acquisition unit 10 starts to contact the ground with the rotation of the tire 3. Hereinafter, a peak value at the start of grounding at which the output voltage of the acceleration acquisition unit 10 takes a maximum value is referred to as a first peak value. As shown in FIG. 4, the output voltage of the acceleration acquisition unit 10 has a minimum value at the contact end time when the portion of the tread 31 of the tire 3 corresponding to the position of the acceleration acquisition unit 10 is changed from a state contacting the ground to a state not contacting the ground with the rotation of the tire 3. Hereinafter, the peak value at the end of grounding where the output voltage of the acceleration acquisition unit 10 takes a minimum value is referred to as a second peak value.

The reason why the output voltage of the acceleration acquisition unit 10 has peak values at the above timing is as follows. When the portion of the tread 31 corresponding to the position of the acceleration acquisition unit 10 contacts the ground with the rotation of the tire 3, a portion of the tire 3, which had a substantially cylindrical surface, is pressed to be deformed into a flat shape in the vicinity of the acceleration acquisition unit 10. Upon receiving the impact at this time, the output voltage of the acceleration acquisition unit 10 has the first peak value. When the portion of the tread 31 corresponding to the position of the acceleration acquisition unit 10 is separated from the ground with the rotation of the tire 3, the pressing of the portion of the tire 3 is released in the vicinity of the acceleration acquisition unit 10, and the flat shape of the portion of the tire 3 returns to the substantially cylindrical shape. Upon receiving the impact when the shape of the tire 3 returns, the output voltage of the acceleration acquisition unit 10 has the second peak value. In this way, the output voltage of the acceleration acquisition unit 10 has the first peak value and the second peak value at the contact start time and the contact end time, respectively. Since a direction of impact when the tire 3 is pressed and a direction of impact when the tire 3 is released from pressurization are opposite, the signs of the output voltages are also opposite.

Here, the moment at which the portion of the tire tread 31 corresponding to the arrangement location of the acceleration acquisition unit 10 contacts the road surface is referred to as a step-in region, and the moment at which the tire tread 41 leaves the road surface is referred to as a kick-out region. The "step-in region" includes a timing when the first peak value is reached, and the "kick-out region" includes a timing when the second peak value is reached. In addition, a region before the step-in region is referred to as a "pre-step-in region", a region from the step-in region to the kick-out region, that is, a region where the tire tread 31 corresponding to the location of the acceleration acquisition unit 10 is in contact with the ground, is referred to as a "pre-kick-out region", and a region after the kick-out region is referred to as a "post-kick-out region". In this manner, the period in which the portion of the tire tread 31 corresponding to the location of the acceleration acquisition unit 10 is in contact with the ground and before and after that portion can be divided into five regions. In FIG. 4, the pre-step-in region, the step-in region, the pre-kick-out region, the kick-out region and the post-kick-out region of the detection signal are indicated as five regions R1 to R5 in sequence, respectively.

The vibration generated in the tire 3 varies in each of the divided regions according to the road surface condition, and the detection signal of the acceleration acquisition unit 10 changes correspondingly. Therefore, by analyzing the frequency of the detection signal of the acceleration acquisition unit 10 in each region, the road surface condition of the vehicle on the road surface is detected. For example, in a slippy road surface condition such as a snow-covered road, the shearing force at the time of kicking out decreases, so that a band value selected from 1 kHz to 4 kHz band becomes small in the kick-out region R4 and the post-kick-out region R5. Since each frequency component of the detection signal of the acceleration acquisition unit 10 changes according to the road surface condition, it is possible to determine the road surface condition based on the frequency analysis of the detection signal.

Figure 5:
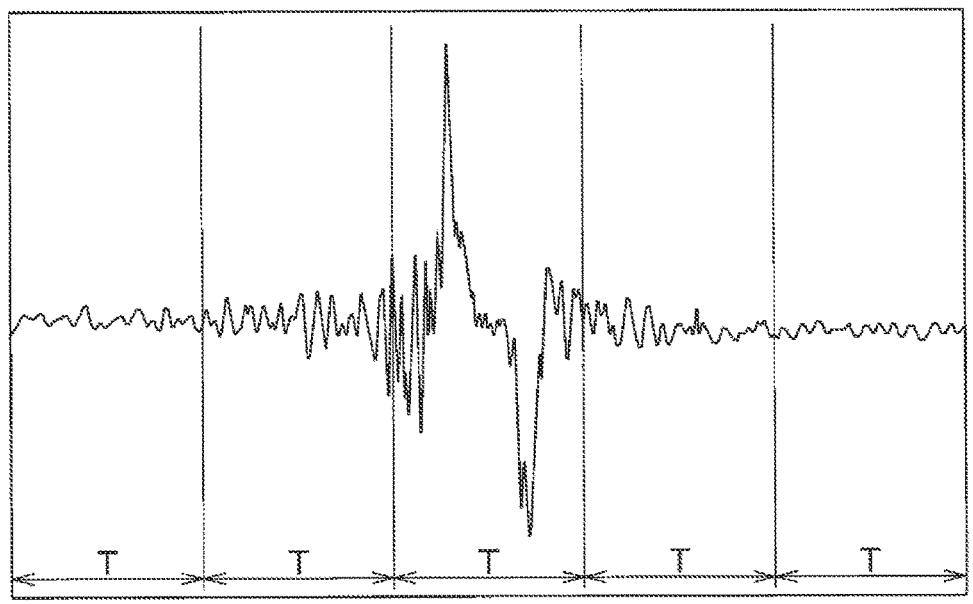
FIG. 5 is a waveform chart illustrating a detection signal from the acceleration acquisition unit which is segmented by each of time windows having a predetermined time width T.

Therefore, the feature amount extraction part 11a divides the detection signal of the acceleration acquisition unit 10 for one rotation of the tire 3, which has a continuous time axis waveform, into a plurality of sections each having a predetermined time width T as shown in FIG. 5, performs the frequency analysis in each section, and extracts the characteristic value. Specifically, by performing the frequency analysis in each section, the control unit 11 calculates a power spectrum value in each frequency band, that is, a vibration level in a specific frequency band, and this power spectrum value is used as the characteristic value.

The number of sections divided by the time window of the time width T is a value that varies with the vehicle speed, more specifically, with the rotation speed of the tire 3. In the following description, the number of sections for one rotation of the tire 3 is assumed to be "n" (where "n" is a natural number).

For example, the characteristic value is calculated as the power spectrum value, which is acquired by passing the detection signal of each section through a plurality of filters of a specific frequency band, for example, five band-pass filters of 0 to 1 kHz, 1 to 2 kHz, 2 to 3 kHz, 3 to 4 kHz and 4 to 5 kHz. This characteristic value is called a characteristic vector, and the characteristic vector Xi of a section i (where i is a natural number of 1≤i≤n) is expressed as a matrix having power spectrum values of each specific frequency band as elements as shown in the following equation. The power spectrum value of each specific frequency band is indicated by aik.

$$X_i = \begin{bmatrix} a_{i1} \\ a_{i2} \\ a_{i3} \\ a_{i4} \\ a_{i5} \end{bmatrix} \quad \text{[Equation 1]}$$

"K" of the power spectrum value $a_{ik}$ is the number of the specific frequency bands, that is, the number of the band-pass filters. In case that the frequency band of 0 to 5 kHz is divided into five sections as exemplified above, "k" is 1 to 5. A determinant X that comprehensively represents the characteristic vectors X1 to Xn of all the sections 1 to n is as follows.

$$X = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \quad \text{[Equation 2]}$$

This determinant X is an equation representing the characteristic value of one rotation of the tire. The feature amount extraction part 11a extracts the feature amount represented by the determinant X by frequency-analyzing the detection signal of the acceleration acquisition unit 10.

Subsequently, a description will be given of determination of a change about the road surface condition, which is performed by the change determination unit 11c. The determination is made by calculating a degree of similarity using the present feature amount extracted by the feature amount extraction part 11a and the immediately previous feature amount stored in the feature amount storage part 11b.

Regarding the determinant X representing the feature amount as described above, the determinant of the present feature amount is expressed as X (r), the determinant of the feature amount of immediately previous time is expressed as X (r−1), and a power spectrum value aik as each element of the determinants is expressed as a(r)ik and a(r−1)ik. In this case, the determinant X(r) of the present feature amount and the determinant X(r−1) of the feature amount of the immediately previous time are expressed as follows, respectively.

$$X(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{[Equation 3]}$$

$$X(r-1) = \begin{pmatrix} a(r-1)_{11} & a(r-1)_{21} & \cdots & a(r-1)_{n1} \\ a(r-1)_{12} & a(r-1)_{22} & \cdots & a(r-1)_{n2} \\ a(r-1)_{13} & a(r-1)_{23} & \cdots & a(r-1)_{n3} \\ a(r-1)_{14} & a(r-1)_{24} & \cdots & a(r-1)_{n4} \\ a(r-1)_{15} & a(r-1)_{25} & \cdots & a(r-1)_{n5} \end{pmatrix} \quad \text{[Equation 4]}$$

A degree of similarity indicates the degree of similarity between the feature amounts represented by the two determinants, and the degree of similarity means that the higher the degree of similarity, the more similar it is. In the case of the present embodiment, the change determination part 11c calculates the degree of similarity using the kernel method, and determines the change in the road surface condition based on the degree of similarity. Here, an inner product of the determinant X(r) at the time of the present rotation of the tire 3 and the determinant X(r−1) one rotation before, that is, a distance between coordinates indicated by the characteristic vectors Xi of the individual sections divided for each time window of the predetermined time width T in a characteristic space, is calculated and used as the degree of similarity.

Figure 6:
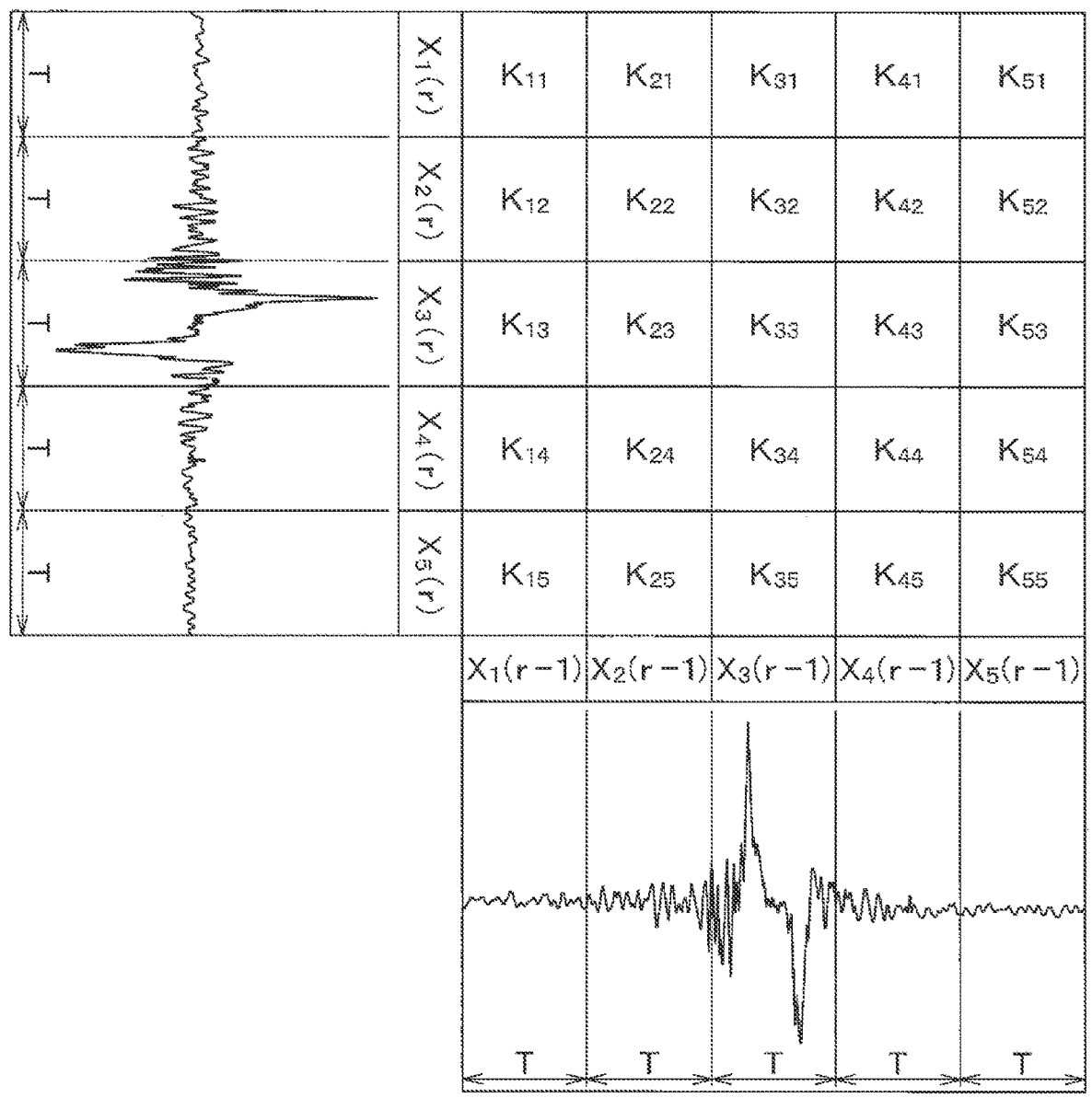
FIG. 6 is a graph illustrating relationships between determinants $X_i(r)$ and $X_i(r-1)$ and a distance $K_{yz}$ in each of segments resulting from segmentation of a time axis waveform during a most recent rotation of the tire and a time axis waveform during an immediately previous rotation of the tire by each of the time windows having the predetermined time width T.

For example, as shown in FIG. 6, regarding a time axis waveform of the detection signal of the acceleration acquisition unit 10, each of the time axis waveform at the time of the present rotation of the tire 3 and the time axis waveform at the time of one rotation before is divided into each section by a time window set to a predetermined time width T. In the illustrated example, since each time axis waveform is divided into five sections, "n" is 5, and "i" is represented by 1≤i≤5. Here, as shown in the figure, the feature vector Xi of each section at the time of present rotation is Xi(r), and the feature vector of each section at the time of one rotation before is Xi(r−1). In this case, regarding the distance Kyz between the coordinates indicated by the feature vector Xi of each section, it is shown like a cell where a horizontal cell including the feature vector Xi(r) of each section at the time of present rotation of the tire 3 and a vertical cell containing the feature vector Xi(r−1) at the time of one rotation before. As for the distance Kyz, "y" is obtained by rewriting "i" in Xi(r−1), and "z" is obtained by rewriting "i" in Xi(r). In addition, since there is no significant change in vehicle speed between the present rotation and one rotation before, the number of sections at each rotation is basically the same.

In case of the present embodiment, the feature vectors are acquired by dividing into five specific frequency bands. Therefore, the feature vector Xi of each section is represented in the six-dimensional space combined with the time axis, and the distance between the coordinates indicated by the feature vectors Xi of the individual sections is the distance between the coordinates in the six-dimensional space. However, the distance between the coordinates indicated by the feature vector of each section is smaller and larger as the feature amounts are more similar and less similar, respectively. Therefore, the degree of similarity becomes higher as the distance becomes smaller, and the degree of similarity becomes lower as the distance becomes larger.

For example, in case the sections 1 to n are provided by time division, the distances Kyz between the coordinates represented by the feature vectors in the individual sections 1 is expressed by the following equation.

[Equation 5]
$$Kyz = \sqrt{\{a(r)_{11} - a(r-1)_{11}\}^2 + \{a(r)_{12} - a(r-1)_{12}\}^2 + \ldots \\ \{a(r)_{15} - a(r-1)_{15}\}^2}$$

In this way, the distance Kyz between the coordinates indicated by the feature vectors of the individual sections by time division is acquired for all the sections, a total sum Ktotal of the distances Kyz of all sections is calculated, and this total Ktotal is used as a value corresponding to the degree of similarity. Then, the total sum Ktotal is compared with a predetermined threshold Th, and if the total sum Ktotal is larger than the threshold Th, it is determined that the degree of similarity is low and there is a change about the road surface condition, and if the total sum Ktotal is smaller than the threshold Th, it is determined that the degree of similarity is high and there is no change about the road surface condition.

Here, the total sum Ktotal of the distances Kyz between the two coordinates indicated by the feature vectors of the respective sections is used as the value corresponding to the degree of similarity. However, another parameter indicating the degree of similarity may be used. For example, as a parameter indicating the degree of similarity, an average distance Kave, which is an average value of the distance Kyz obtained by dividing the total sum Ktotal by the number of sections, can be used. It is also possible to obtain the degree of similarity using various kernel functions. Instead of using all of the feature vectors, the degree of similarity may be calculated by excluding a path having a low degree of similarity from the feature vectors.

Next, the method of calculating the integrated value by the integral calculation part $25d$ and the details of the wear determination by the wear determination part $25e$ will be described.

As described above, the power spectrum value obtained by passing the detection signal of the acceleration acquisition unit 10 through a plurality of filters in a specific frequency band is calculated as a feature amount, and is represented by the matrix shown in Equation 1. Therefore, when five bandpass filters of 0 to 1 kHz, 1 to 2 kHz, 2 to 3 kHz, 3 to 4 kHz, and 4 to 5 kHz are used, a first row of the determinant shown in Equation 2 represents the feature amount in the 0 to 1 kHz band, and each line in turn represents the feature amount of each frequency band. Further, a first column represents the feature amount in the first time width T of each section divided by a plurality of time widths T, and each column sequentially represents the feature amount in each time width T.

Therefore, the sum of the feature amounts of each column in the same row is a value corresponding to the integrated value of the feature amounts for one rotation of the tire 3 in the frequency band corresponding to the row. The integral calculation part $25d$ calculates the sum of the feature amounts of each column of the row corresponding to the specific frequency band as the integrated value of the feature amounts of the specific frequency band. The specific frequency band referred to here means a high frequency band in which the feature amount changes according to the wear state of the tire 3, and corresponds to, for example, a frequency band of 1 kHz or more. Therefore, the integral calculation part $25d$ calculates the integrated value of the feature amount in the frequency band of 1 kHz or more. When the bandpass filter of the frequency band described above is used, the integral calculation part $25d$ calculates the total value of the sum of the feature amounts of each column in the 2nd to 5th rows as the integrated value of the feature amounts in the frequency band of 1 kHz to 5 kHz.

Here, the total value of the sum of the feature amounts of all frequency bands in the frequency band of 1 kHz or higher is used as the integrated value, but at least some of the feature amounts may be used as the integrated value. That is, the sum of the feature amounts of any one frequency band of 1 kHz or higher may be used as the integrated value, or the total value of the sum of the feature amounts of a plurality of frequency bands may be used as the integrated value.

Here, the reason why the feature amount changes according to the tire wear state and the reason why the change occurs in the high frequency band will be described.

The frequency characteristics of the vibration level in the step-in region and the kick-out region of the tire 3 are determined based on the vibration characteristics of the tire 3 including a rubber block, and the vibration level takes a peak at the natural frequency of the tire 3 including the rubber block. In the frequency range higher than the natural frequency, the vibration level decreases due to the vibration reduction effect of the rubber block. The natural frequency of the tire 3 including the rubber block changes due to the wear state of the rubber block, and the natural frequency increases as the wear of the rubber block progresses.

Figure 7:
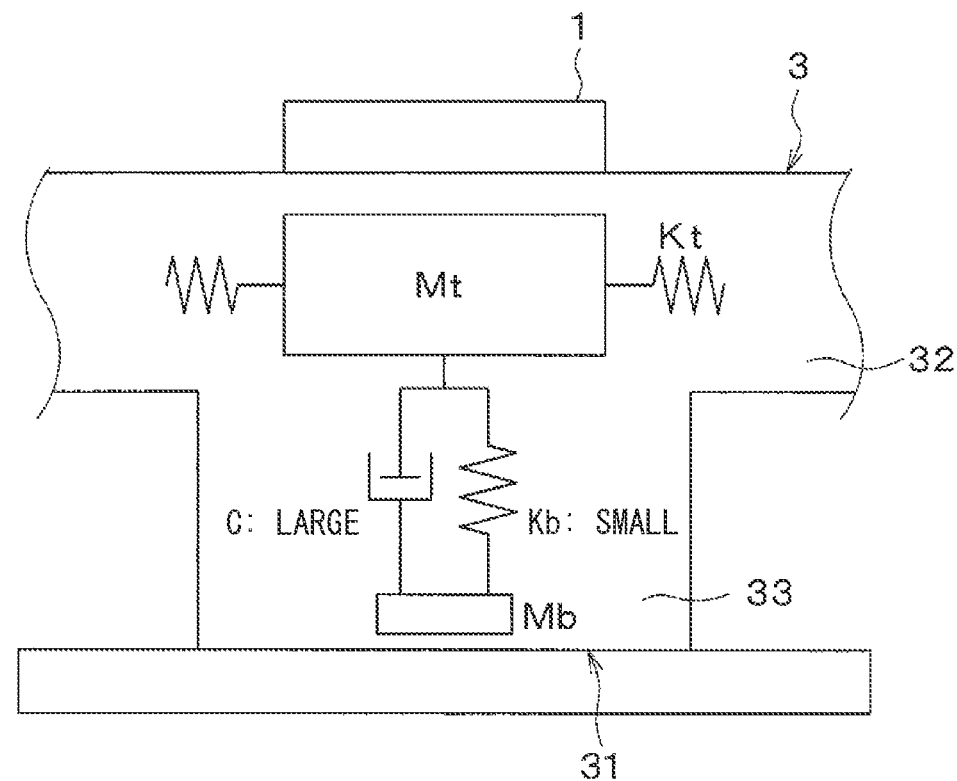
FIG. 7 is a diagram illustrating a vibration model of the tire.

This point will be described with reference to the drawings. FIG. 7 shows a vibration model of the tire 3. A mass of the portion of a tread surface 32 and a rubber block 33 of the tire 3 which may affect the vibration applied to the tire side device 1 is represented by Mt, a spring constant is represented by Kt, a mass of the rubber block 33 is represented by Mb, and a damping coefficient is represented by C. In the tire 3, the rubber block 33 works as a vibration reducing member against the vibration input from the road surface to function as a low-pass filter.

When the tire 3 is new, a groove of the tire tread 31 is deep, and a height of the rubber block 33 is high. In contrast, when the tire 3 has been worn, the groove of the tire tread 31 becomes shallow, and the height of the rubber block 33 becomes low. Accordingly, the worn tire has smaller mass Mb of the rubber block 33 and large spring constant Kb as compared with new tire 3. Thus, the function of the rubber block 33 as the low-pass filter is reduced, and the high frequency components of the tire vibration is increased.

Figure 8:
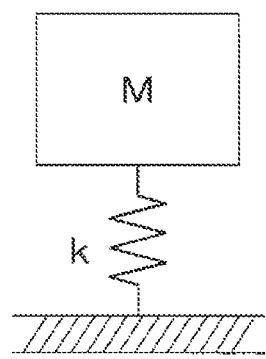
FIG. 8 is a diagram of a general vibration model.

A general vibration model is shown in FIG. 8, and the natural frequency Fn in this vibration model is expressed by the following equation. In Equation 1, k is the spring constant of the vibration isolator in the vibration model, and m is the mass of the vibration source.

$$Fn = \frac{1}{2\pi}\sqrt{\frac{k}{m}} \qquad \text{[Equation 6]}$$

The spring constant k is calculated by multiplying the Young's modulus determined by a vibration object constituting the vibration model, i.e. the material of the rubber block 33 in the present embodiment, by the area of the vibration object, and dividing the multiplied value by a thickness of the vibration object, i.e. the height of the vibration object.

In the vibration model of the tire 3 shown in FIG. 7, the mass Mt is sufficiently larger than the mass Mb, and the spring constant Kt is sufficiently larger than the spring constant Kb. Accordingly, the vibration model of FIG. 7 can be regarded as a general vibration model shown in FIG. 8 in consideration of only the mass Mt and the spring constant Kb. That is, the mass m and the spring constant k in the Equation 1 can be replaced with the mass Mt and the spring constant Kb of FIG. 7. When the height of the rubber block 33 reduces due to wear, the mass Mb reduces and the spring constant Kb increases accordingly. When the change of the mass Mt is small and the spring constant Kb increases, the natural frequency Fn represented by the equation 6 increases.

Figure 9:
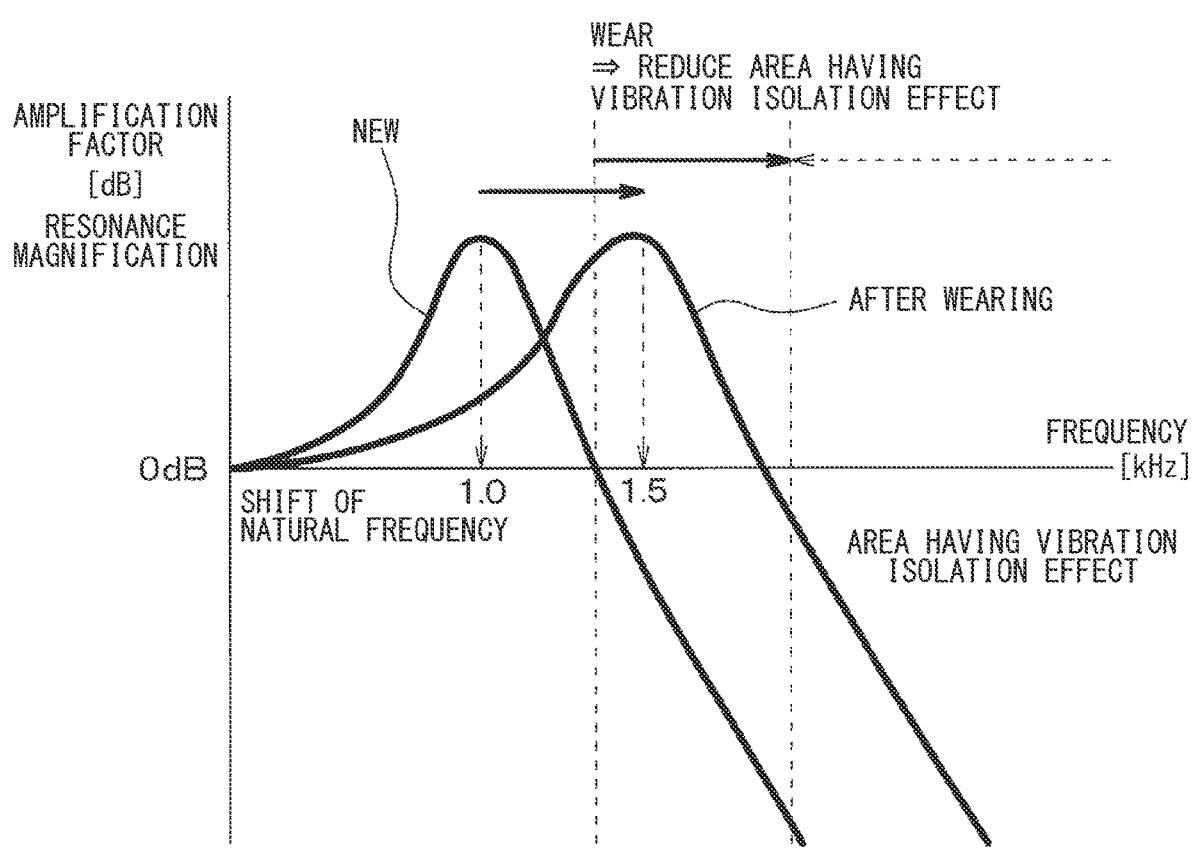
FIG. 9 is a diagram showing the results when the frequency characteristics of the vibration level of the tire are examined for each of a new tire and a worn tire.

The frequency characteristics of the vibration level in the step-in region and the kick-out region of the tire 3 are determined based on the vibration characteristics of the tire 3 including the rubber block 33, and the vibration level takes a peak at the natural frequency Fn of the tire 3 including the rubber block 33. The natural frequency Fn increases as the rubber block 33 wears and its height decreases. For example, as shown in FIG. 9, when the tire 3 is new and the groove depth is 8 mm, the natural frequency Fn is 1.0 kHz, and when the tire 3 is worn and the groove depth is 1.6 mm, the natural frequency Fn became 1.5 kHz. Although the natural frequency Fn varies depending on the material of the tire 3, the natural frequency Fn increases as the tire 3 wears regardless of the material of the tire 3.

Therefore, a specific depth of the groove is preset as a replacement standard for replacing the tire 3, the natural frequency Fn when the groove depth of the tire 3 serves as a guideline for replacement is set as a specific frequency. A frequency band higher than that is set as a specific frequency band, and the integrated value of the feature amount of the specific frequency band is calculated. For example, if the recommended groove depth for replacement of the tire 3 is 3.0 mm and the depth is used as the groove depth as a guideline for replacement of the tire 3, for example, it has been confirmed that the differential value of the feature amount in the high frequency band of 1.0 kHz or higher should be calculated.

In this way, since the frequency characteristic of the vibration level of the tire 3 changes according to the tire wear state, the feature amount changes according to the tire wear state. In addition, a change in the feature amount appears particularly in the high frequency band in which the natural frequency of the tire 3 is taken into consideration. Therefore, the integral calculation part 25d calculates the integrated value of the feature amount in the high frequency band.

Subsequently, a description will be given of an operation of the tire device 100 according to the present embodiment with reference to FIG. 10.

Figure 10:
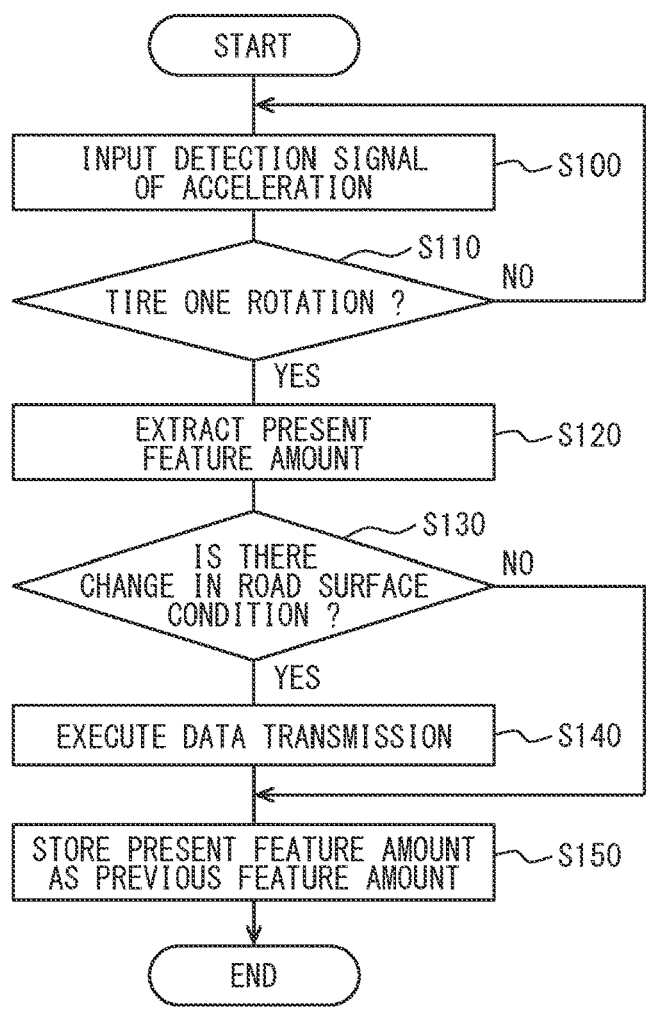
FIG. 10 is a flow chart of a data transmission process to be performed by a control unit of the tire side device.

In the tire side device 1 of each wheel, the control unit 11 executes a data transmission process shown in FIG. 10. This process is executed at predetermined control cycles.

First, in step S100, a detection signal input process of the acceleration acquisition unit 10 is performed. This process is continued for a period until the tire 3 makes one rotation in the subsequent step S110. Then, when the detection signal of the acceleration acquisition unit 10 is input for one rotation of the tire, the process proceeds to the subsequent step S120, and the feature amount of the time axis waveform of the detection signal of the acceleration acquisition unit 10 for the input one rotation of the tire is extracted. The processes in the above steps S100 to S120 are performed by the feature amount extraction part 11a.

The fact that the tire 3 has made one rotation is determined based on the time axis waveform of the detection signal of the acceleration acquisition unit 10. That is, since the detection signal draws the time axis waveform shown in FIG. 4, one rotation of the tire 3 can be determined by checking the first peak value and the second peak value of the detection signal.

The road surface state especially appears as a change in the time axis waveform of the detection signal during the period before and after including "step-in region", "pre-kick-out region", and "kick-out region". Therefore, it is sufficient that the data during this period is input, and it is not always necessary to input all the data of the detection signals of the acceleration acquisition unit 10 during one rotation of the tire. For example, for the date in the "pre-step-in region" and the "post-kick-out region", it is sufficient that there is data in the vicinity of the "step-in region" or the "kick-out region". Therefore, in the region where the vibration level of the detection signal of the acceleration acquisition unit 10 is smaller than the threshold value, the detection signal may not input as a period during which the road surface state is not easily affected even in the "pre-step-in region" and "post-kick-out region".

The extraction of the feature amount performed in step S120 is performed exactly in accordance with the method described above.

After that, the process proceeds to step S130, and the degree of similarity is obtained by the above-mentioned method based on the present feature amount and the previous feature amount. For example, it is determined whether or not there is a change in the road surface condition by comparing the degree of similarity with the threshold value Th. This process is executed by the change determination part 11c, and is executed based on the present feature amount extracted by the feature amount extraction part 11a and the immediately previous feature amount stored in the feature amount storage part 11b in step S150 described later.

Then, if an affirmative determination is made in step S130, the change determination part 11c transmits the road surface data including the present feature amount to the data communication unit 12 in order to execute the data transmission in step S140. As a result, the data communication unit 12 transmits the road surface data including the present feature amount. In this way, the road surface data including the present feature amount is transmitted from the data communication unit 12 only when there is a change in the road surface condition, and the data is not transmitted when there is no change in the road surface condition. Therefore, it is possible to decrease communication frequency, and it is possible to achieve in saving power consumption of the control unit 11 in the tire 3.

Finally, the process proceeds to step S150, and the present feature amount is stored in the feature amount storage part 11b as the immediately previous feature amount, and the process is completed.

Figure 11:
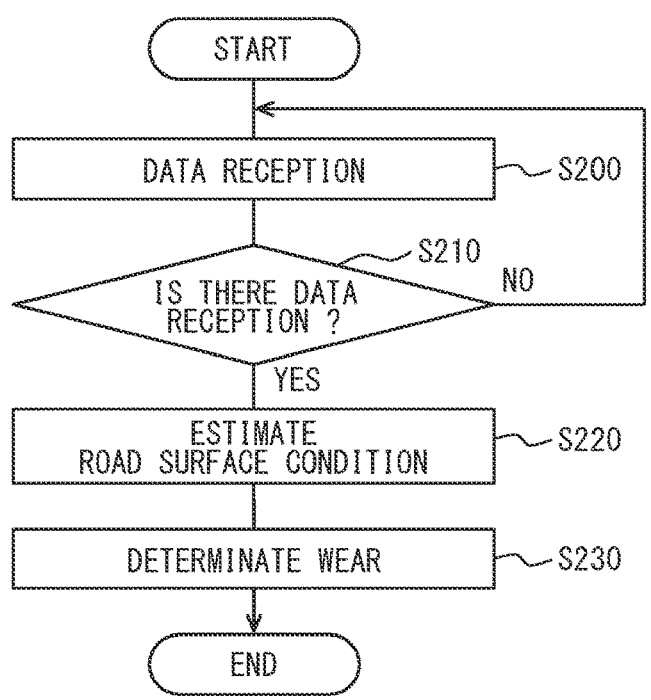
FIG. 11 is a flowchart of a road surface condition determination and wear detection process executed by a control unit of a vehicle body side system.

On the other hand, in the receiver 21, the control unit 25 performs the road surface condition determination and wear detection process shown in FIG. 11. This process is executed at predetermined control cycles when a vehicle start switch such as an ignition switch (not shown) is turned on.

First, in step S200, data reception process is performed. When the data communication unit 24 receives the road surface data, the control unit 25 obtains the road surface data, so that this process is performed. When the data communication unit 24 does not perform the data reception, the control unit 25 ends this process without obtaining any road surface data.

The process then proceeds to S210 and determines whether data is received. If data is received, the process proceeds to S220. If no data is received, the process in steps S200 and S210 is repeated until data is received.

Then, the process proceeds to step S220 to determine the road surface condition. Regarding the determination of the road surface condition, the road surface condition is determined by comparing the present feature amount included in the received road surface data with the support vector for each type of road surface stored in the support vector storage part 25a. Fro example, the degree of similarity between the present feature amount and all the support vectors for each type of road surface is obtained, and the road surface of the support vector with the highest degree of similarity is determined to be the current traveling road surface. Regarding the calculation of the degree of similarity at this time, the same method in step S130 of FIG. 10 as the calculation of the degree of similarity between the present feature amount and the immediately previous feature amount may be used.

Figure 12:
FIG. 12 is a diagram showing a relationship between a tire groove depth and an integrated value of a feature amount.

Subsequently, the process proceeds to step S230, and the wear detection is performed. As described above, after the integral calculation part 25d calculates the sum of the feature amounts of the specific frequency band shown by Equation 2 as the integral value, the wear detection is performed by comparing the integral value with a determination threshold value. For example, since a relationship between the groove depth corresponding to the amount of wear of the tire 3 and the integral value is shown as shown in FIG. 12, the integral value at the groove depth as a guideline for replacing the tire 3 is set as the determination threshold value. Then, when the integral value calculated by the integral calculation part 25d becomes equal to or less than the determination threshold value, it is detected that the tire wear has occurred.

As described above, the tire device 100 according to the present embodiment determines the road surface condition of the traveling road surface of the vehicle and detects the tire wear state. Then, the tire wear state is detected by using the road surface data for determining the road surface condition and using the sum of the feature amounts of the specific frequency band in the road surface data as the integral value. This configuration eliminates the need to transmit data only for detecting the tire wear state. Therefore, it is not necessary to implement an algorithm for detecting the tire wear state on the tire side device 1, and it is possible to save power and memory by minimizing sampling, storage, and various arithmetic processes. Therefore, the tire device 100 can realize further power saving and memory saving while enabling the determination of the road surface condition and the detection of the tire wear state.

Further, when the road surface condition is determined, the road surface data including the present feature amount is transmitted from the tire side device 1 only at the change timing of the road surface condition. Therefore, it is possible to decrease communication frequency, and it is also possible to achieve in saving power consumption of the control unit 11 in the tire 3.

It should be noted that the tire wear state does not have to be detected frequently, and may be detected only once when the vehicle is running, for example, once during the period when the start switch is turned on. Therefore, if the tire wear state is detected using the road surface data for determining the road surface condition, there is no problem even if the data is not transmitted only for detecting the tire wear state. Further, as described above, since the road surface data is sent from the tire side device 1 to the vehicle body side system 2 when the road surface condition changes, the tire wear condition is also detected each time, but the frequency of detecting the tire wear may be reduced. Therefore, for example, if the tire wear state has been detected since the start switch was turned on, a flag indicating that the tire wear state is detected is set. If the flag is set, the process of step S230 may not be executed.

Second Embodiment

A second embodiment will be described. The present embodiment is different from the first embodiment because the tire wear state can be detected in consideration of the vehicle state with respect to the first embodiment, and the other configurations are the same as those of the first embodiment. Only the different configurations will be described.

Figure 13:
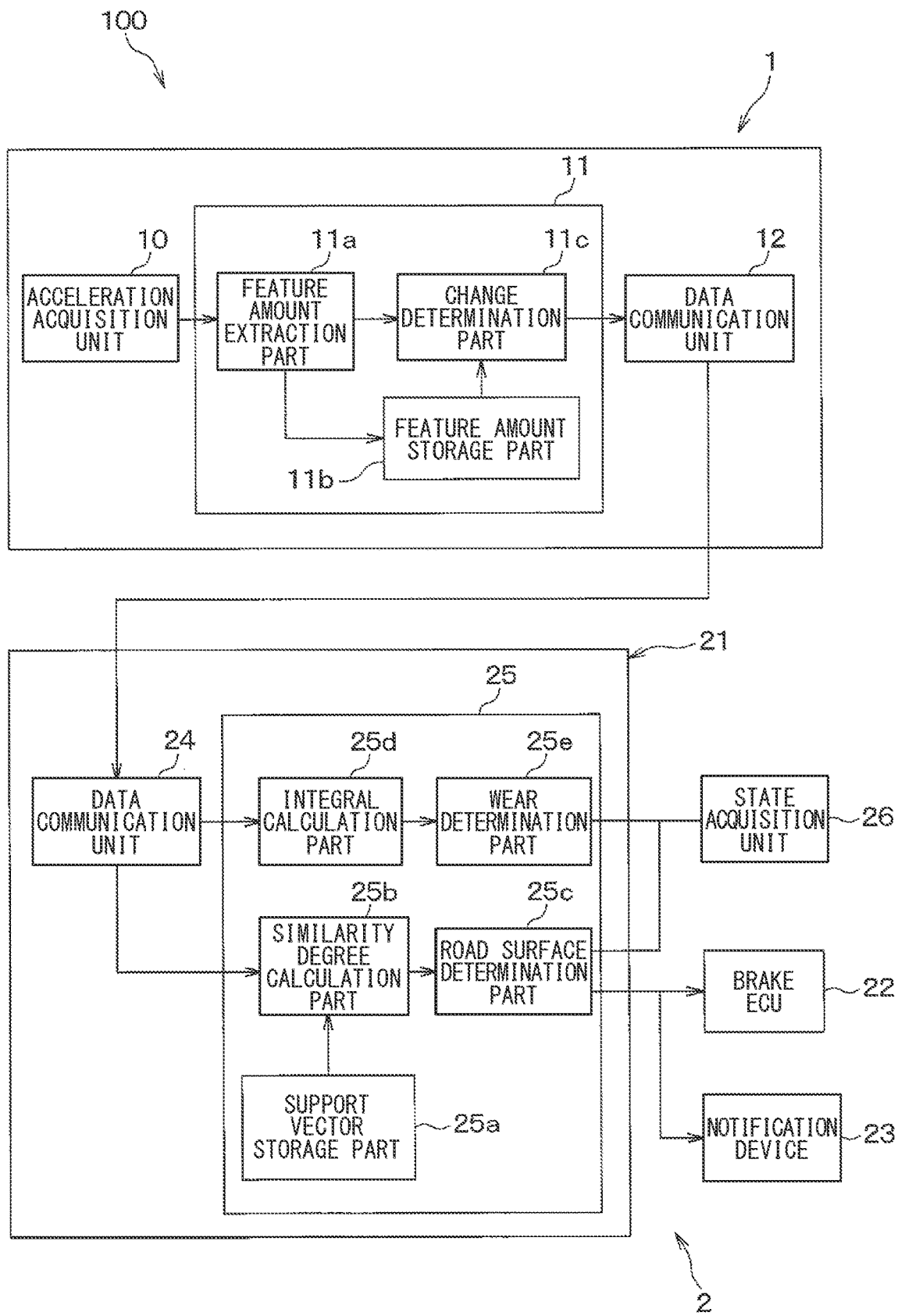
FIG. 13 is a block diagram illustrating details of a tire side device and a vehicle body side system provided in a tire device according to a second embodiment.

As shown in FIG. 13, the tire device 100 of the present embodiment includes a state acquisition unit 26 in the vehicle body side system 2, and a vehicle information acquired by the state acquisition unit 26 is transmitted to the control unit 25 through the in-vehicle LAN. Then, in the control unit 25, the vehicle information is considered when the road surface determination part 25c determines the road surface condition or when the wear determination part 25e detects the tire wear state.

The vehicle information referred to here means information related to the tire wear state. The information related to the tire wear state is information that affects the detection of the tire wear state, and includes vehicle speed information, acceleration/deceleration information, steering information, road surface information, weather information, position information, temperature information, and the like. The vehicle information can be acquired by communicating with various ECUs provided in the vehicle or external devices.

The vehicle speed information is information indicating the speed of the vehicle. The higher the vehicle speed, the larger the amplitude of the vibration waveform indicated by the detection signal of the acceleration acquisition unit 10. That is, also with respect to the relationship shown in FIG. 12 described above, even if the amount of wear of the tire 3 is the same, the integral value of the feature amount is high when the vehicle speed is high, and the integral value of the feature amount is low when the vehicle speed is low. Therefore, based on the vehicle speed information, the higher the vehicle speed, the larger the integral value of the feature amount can be calculated. Therefore, the higher the vehicle speed, the higher the determination threshold value when detecting the tire wear state can be corrected, and on the contrary, the integral value of the feature amount can be corrected to a small value. Further, if the vehicle speed is equal to or higher than a predetermined speed, it is possible not to detect the tire wear state.

Acceleration/deceleration information is information indicating the acceleration/deceleration of the vehicle. For example, when suddenly accelerating or braking, it may not be possible to accurately detect the tire wear state. Therefore, based on the acceleration/deceleration information, it is possible to detect the tire wear state when the acceleration/deceleration is within a predetermined range and not to detect the tire wear state when the acceleration/deceleration is outside the predetermined range.

The steering information is information on a steering angle of the steering wheel in the vehicle. When the vehicle is turning, it may not be possible to accurately detect the tire wear state. Therefore, based on the steering information, it is possible to detect the tire wear state when the steering angle is within a predetermined range, and not to detect the tire wear state when the steering angle is outside the predetermined range.

The road surface information is information indicating a state of the traveling road surface of the vehicle. For example, it is possible to grasp the road surface condition such as an uneven road such as a gravel road from the road information and the position information obtained from a navigation device or the like. On uneven roads and the like, the effect appears in the detection signal of the acceleration acquisition unit 10, so there is a possibility that the tire wear state cannot be accurately detected. Therefore, based on the road surface information, it is possible to detect the tire wear state on a flat road such as an asphalt road surface, and not to detect the tire wear state on other than the flat road.

The weather information is information indicating the weather such as fine weather, rainy weather, and snow, and when used together with the position information, the weather at the traveling place of the vehicle is specified. For example, compared to the case of fine weather, the road surface p tends to be lower in rainy weather or snow, and the vibration component due to slip may be superimposed on the detection signal of the acceleration acquisition unit 10, and it may not be possible to accurately detect the tire wear state. Therefore, based on the weather information, it is possible to detect the tire wear state in the case of fine weather, for example, and not to detect the tire wear state in cases other than fine weather such as rainy weather and snow.

The temperature information is information indicating an outside air temperature. When the outside air temperature is higher or lower than the assumed temperature range, the fluctuation of the spring constant of the tire 3 becomes large and the vibration characteristic of the tire 3 changes, so that it may not be possible to accurately detect the tire wear state. Therefore, based on the temperature information, it is possible to detect the tire wear state when it is within a predetermined temperature range and not to detect the tire wear state when it is outside the temperature range.

In this way, the tire wear state can be detected by considering the vehicle information. Accordingly, it possible to detect the tire wear state more accurately.

Although the case where the vehicle information is used for detecting the tire wear state has been described here, the vehicle information can also be used for determining the road surface condition. In this way, if the vehicle information is used for determining the road surface condition, it is possible to detect the road surface condition more accurately.

Third Embodiment

A third embodiment will be described. The present embodiment is a modification of the method for detecting the tire wear state with respect to the first and second embodiments, and is the same as the first and second embodiments in other configurations. Therefore, only the configurations different from the embodiment will be described.

Figure 14:
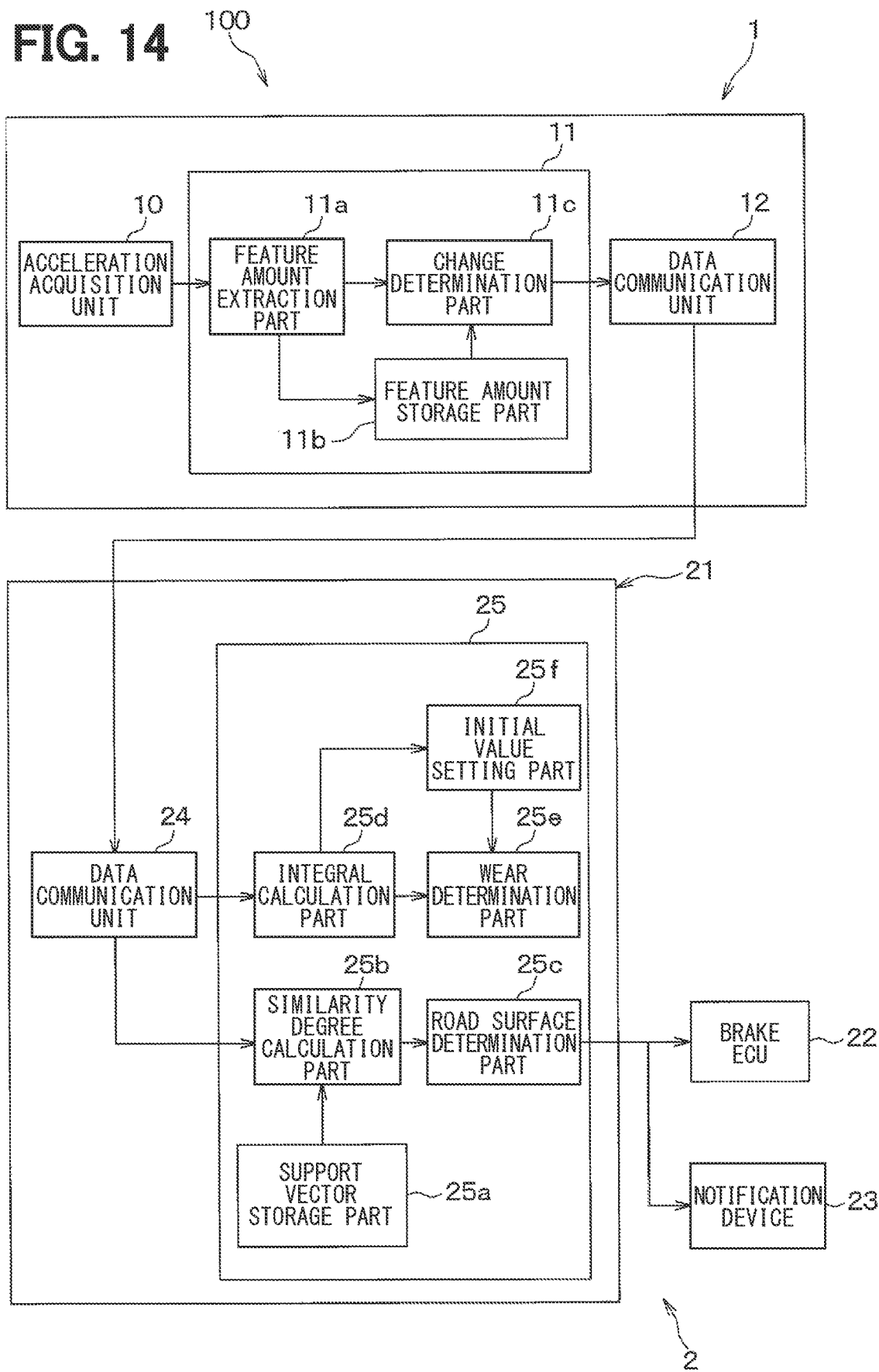
FIG. 14 is a block diagram showing details of a tire side device and a vehicle body side system provided in a tire device according to a third embodiment.

As shown in FIG. 14, in the tire device 100 of the present embodiment, the control unit 25 in the vehicle body side system 2 is provided with an initial value setting part 25f.

The initial value setting part 25f stores an initial integral value calculated by the integral calculation part 25d as an initial value, that is, an integral value in a state before the tire 3 is worn. For example, the first integral value detected at the timing of the first running after the vehicle is manufactured can be used as the initial value, or the initial integral value detected at the timing of the first running when a setting switch or the like (not shown) is pressed at the time of tire replacement can be used as the initial value. The wear determination part 25e detects the tire wear state from a relative change between the initial value stored in the initial value setting part 25f and the integral value of the feature amount calculated by the integral calculation part 25d. For example, the wear determination part 25e can determine that the tire wear has progressed when the integral value of the feature amount calculated by the integral calculation part 25d is reduced by a predetermined ratio with respect to the initial value.

In this way, the initial value setting part 25f is provided so as to store the integrated value of the tire 3 before wear as the initial value, and it is possible to detect the tire wear state by the relative change of the integral value of the feature amount calculated by the integral calculation part 25d from this initial value. In this way, the tire wear state can be detected without setting the determination threshold value corresponding to various vehicle types and tire types.

Other Embodiments

Although the present disclosure has been described in accordance with the above-described embodiments, the present disclosure is not limited to the above-described embodiments, and encompasses various modifications and variations within the scope of equivalents. In addition, while various combinations and configurations, which are preferred, other combinations and configurations including further only a single element, more or less, are also within the spirit and scope of the present disclosure.

For example, in each of the above embodiments, the road surface data is transmitted from the tire side device 1 to the vehicle body side system 2 only when the road surface condition changes. For the purpose of further power saving, the road surface data may be transmitted at other timings. For example, the road surface data may be transmitted from the tire side device 1 to the vehicle body side system 2 once or a plurality of times each time the tire 3 makes one or a plurality of rotations.

Also, in each of the embodiments described above, the case where the vibration detection unit is formed of the acceleration acquisition unit 10 is shown by way of example. However, the vibration detection unit can also be formed of another element capable of detecting vibration such as, e.g., a piezoelectric element.

Further, in the above embodiment, the control unit 25 of the receiver 21 provided in the vehicle body side system 2 obtains the degree of similarity between the present feature amount and the support vector, and determines the road surface condition. However, this configuration is also only an example, and the control unit of another ECU, for example, the brake ECU 22 may obtain the degree of similarity, or determined the road surface condition.

The control circuit and method described in the present disclosure may be implemented by a special purpose computer which is configured with a memory and a processor programmed to execute one or more particular functions embodied in computer programs of the memory. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A tire device for determining a road surface condition of a vehicle's traveling road surface and detecting a tire wear state, comprising:
    a tire side device provided on a tire side; and
    a vehicle body side system provided on a vehicle body side, wherein
    the tire side device includes
        a vibration detection unit configured to output a detection signal corresponding to a magnitude of vibration of a tire,
        a control unit having a feature amount extraction part configured to extract a feature amount for each frequency band from the detection signal during one rotation of the tire, and
        a first data communication unit configured to transmit a road surface data including the feature amount extracted by the feature amount extraction part,
    the vehicle body side system includes
        a second data communication unit configured to receive the road surface data transmitted from the first data communication unit,
        a road surface determination part configured to determine the road surface condition of the traveling road surface based on the road surface data,
        an integral calculation part configured to calculate an integral value of the feature amount in a specific frequency band using the feature amount for each frequency band included in the road surface data, and
        a wear determination part configured to detect the tire wear state based on the integral value of the feature amount,
    the road surface determination part is further configured to determine the road surface condition of the traveling road surface based on the feature amount for each frequency band included in the road surface data, and
    the integral calculation part is further configured to calculate the integral value of the feature amount in the specific frequency band using the same road surface data as used when the road surface condition is determined by the road surface determination part, and the feature amount for each frequency band included in the road surface data.

2. The tire device according to claim 1, wherein
the vehicle body side system has a state acquisition unit configured to acquire vehicle information related to detection of the tire wear state, and
the wear determination part detects the tire wear state based on the integral value of the feature amount and the vehicle information.

3. The tire device according to claim 2, wherein
the wear determination part detects the tire wear state based on at least one of vehicle speed information, acceleration/deceleration information, steering information, road surface information, weather information and position information, and temperature information as the vehicle information.

4. The tire device according to claim 1, wherein
the vehicle body side system has an initial value setting part configured to set an initial value of an integral value of the feature amount, and
the wear determination part detects the tire wear state based on a relative change of the integral value of the feature amount calculated by the integral calculation part from the initial value.

5. The tire device according to claim 1, wherein
the integral calculation part calculates the integral value of the feature amount in a frequency band of 1 kHz or more as a predetermined frequency band.

6. The tire device according to claim 1, wherein
the tire side device includes
    a feature amount storage part configured to store the feature amount in a past extracted by the feature amount extraction part as a previous feature amount, and
    a change determination part configured to determine whether or not there is a change in the road surface condition based on a present feature amount and the previous feature amount stored in the feature amount storage part, when the feature amount extracted at a time of a present rotation of the tire by the feature amount extraction part is referred to the present feature amount, and transmit the road surface data including the present feature amount by the tire side device when there is a change in the road surface condition.

7. A tire device for determining a road surface condition of a vehicle's traveling road surface and detecting a tire wear state, comprising:
    a tire side device provided on a tire side; and
    a vehicle body side system provided on a vehicle body side, wherein
    the tire side device includes a computer including a processor and a memory that stores instructions configured to, when executed by the processor, cause the processor to
        output a detection signal corresponding to a magnitude of vibration of a tire,
        extract a feature amount for each frequency band from the detection signal during one rotation of the tire; and
        transmit a road surface data including the feature amount,
    the vehicle body side system includes a computer including a processor and a memory that stores instructions configured to, when executed by the processor, cause the processor to
        receive a road surface data transmitted from the tire side device,
        determine the road surface condition of the traveling road surface based on the road surface data, calculate an integral value of the feature amount in a specific frequency band using the feature amount for each frequency band included in the road surface data, detect the tire wear state based on the integral value of the feature amount determine the road surface condition of the traveling road surface based on the feature amount for each frequency band included in the road surface data, and calculate the integral value of the feature amount in the specific frequency band using the same road surface data as used when the road surface condition is determined by the processor, and the feature amount for each frequency band included in the road surface data.

8. The tire device according to claim 7, wherein
the computer in the vehicle body side system causes the processor to
acquire vehicle information related to detection of the tire wear state, and
detect the tire wear state based on the integral value of the feature amount and the vehicle information.

9. The tire device according to claim 8, wherein
the computer in the vehicle body side system causes the processor to
detect the tire wear state based on at least one of vehicle speed information, acceleration/deceleration information, steering information, road surface information, weather information and position information, and temperature information as the vehicle information.

10. The tire device according to claim 7, wherein
the computer in the vehicle body side system causes the processor to
set an initial value of an integral value of the feature amount, and detect the tire wear state based on a relative change of the integral value of the feature amount based on the initial value.

11. The tire device according to claim 7, wherein
the computer in the vehicle body side system causes the processor to
calculate an integral value of the feature amount in a frequency band of 1 kHz or more as a predetermined frequency band.

12. The tire device according to claim 7, wherein
the computer in the tire side device causes the processor to
store the feature amount in a past extracted by a feature amount extraction part as a previous feature amount, and
determine whether or not there is a change in the road surface condition based on a present feature amount and the previous feature amount, when the feature amount extracted at a time of a present rotation of the tire by the feature amount extraction part is referred to the present feature amount, and transmit the road surface data including the present feature amount by the tire side device when there is a change in the road surface condition.

13. The tire device according to claim 3, wherein
based on the steering information, the tire wear state when a steering angle is within a predetermined range is detected, and the tire wear state when the steering angle is outside the predetermined range is not detected.

14. The tire device according to claim 3, wherein
based on the weather information, the tire wear state in a case of fine weather is detected, and the tire wear state in cases of rainy weather is not detected.

15. The tire device according to claim 3, wherein
based on the temperature information, the tire wear state when it is within a predetermined temperature range is detected, and the tire wear state when it is outside the predetermined temperature range is not detected.

* * * * *